United States Patent [19]

Drexler et al.

[11] Patent Number: 4,543,307

[45] Date of Patent: Sep. 24, 1985

[54] OPTICAL DATA STORAGE AND RECORDING MEDIA HAVING RECORDING SURFACE PROTECTION

[75] Inventors: Jerome Drexler, Los Altos Hills; Richard Haddock, Redwood City, both of Calif.

[73] Assignee: Drexler Technology Corporation, Mountain View, Calif.

[21] Appl. No.: 581,324

[22] Filed: Feb. 17, 1984

[51] Int. Cl.[4] .......................... G03C 3/00; G03C 1/00
[52] U.S. Cl. ...................................... 430/12; 430/496; 430/501; 430/945; 428/122; 428/166; 428/172; 346/137; 346/76 L; 369/291
[58] Field of Search ............. 346/137, 76 L; 428/122, 428/172, 166; 369/291; 430/12, 496, 500, 501, 945

[56] References Cited

U.S. PATENT DOCUMENTS 3,539,344 11/1970 Russell ............................... 430/496
4,365,258 12/1982 Geyer et al. ....................... 346/137

FOREIGN PATENT DOCUMENTS 217681  3/1957 Australia ........................... 369/291
469666 12/1928 Fed. Rep. of Germany ...... 369/291
816287  7/1959 United Kingdom ............... 369/291

OTHER PUBLICATIONS

Research Disclosure, Jun. 1984, pp. 280-284 #24238, "Rigid Optical Disks".

Primary Examiner—Mary F. Downey

[57] ABSTRACT

A method for protecting the recording surfaces of optical data storage and recording tape provides the tape edges with protuberances formed by plastic coatings, embossments or thickness gradients of the recording material.

3 Claims, 5 Drawing Figures

4,543,307

OPTICAL DATA STORAGE AND RECORDING MEDIA HAVING RECORDING SURFACE PROTECTION

1. Technical Field

The invention relates to optical data storage and recording media and in particular to those having protected recording surfaces.

2. Background of the Invention

Optical data storage and recording media can be produced in the form of a tape structure which may be stored on a reel. If the optical surface to be used for recording is of a reflective metal type, close contact with the tape backing when wound under tension in the reel frequently causes surface scratches or extraneous particles to become embedded in the recording surface. In the past, the entire recording surface has been coated with a thin layer of clear, protective plastic. However, this layer has disadvantages in that it must be applied in a precise thickness and it lowers the recording sensitivity.

Other means used to protect reflective metallic recording surfaces, such as coverplates, require a stiff substrate to maintain a uniform spacing and are not practical for thin films or tape structures.

It is an object of the present invention to provide a means of achieving a protective spacing between contacting tape surfaces which would not lower the recording sensitivity and would not require precision application. It is another object of the present invention to provide a means for protective spacing which could be applied to both the top and bottom surfaces of the tape simultaneously, either prior to or after preparation of the optical recording surface.

DISCLOSURE OF THE INVENTION

The above objects have been met by providing the edge regions of an optical recording tape with protuberances which extend out of the plane of the recording surface. Direct contact between the recording surfaces and backs of adjacent tape sections on the reel is prevented by the protective spacing formed by protuberances on the tape edges. The protuberances may be formed from the same material as in the active recording area prior to or after forming the optical recording surface or may be formed from a coating of plastic encasing the edges after the optical recording surface is formed. Since the protuberances are placed on the redge regions and not on the active recording area, they do not interfere with recording or reading the data on the tape or with driving the tape.

BEST MODE FOR CARRYING OUT THE INVENTION

Figure 1:
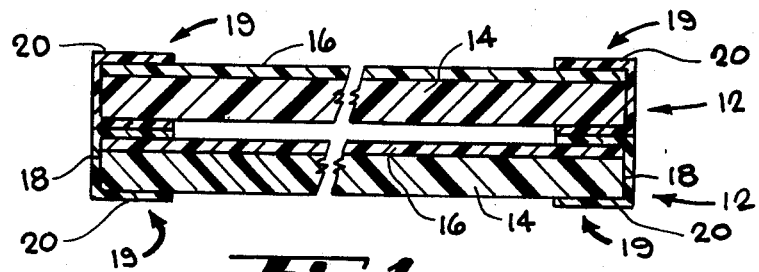
FIG. 1 is a side sectional view of two layers of a reeled optical recording tape of the present invention.

With reference to FIG. 1, a reel portion with major surfaces of recording tape of the present invention is seen. The optical recording tape 12 consists of a substrate 14 supporting an optical recording layer 16 which may be typically a reflective metal layer. In the preferred embodiment, the tape lateral edge regions 19 are encased in a plastic coating 20 which surrounds the top, side, and bottom surfaces at the tape lateral edges. The coating is about 5 microns thick out of both the recording surface 16 and the bottom surface of the substrate 14 of the optical recording tape 12, resulting in a 10-micron separation between the recording surface on one tape and the back of an adjacent tape section when stored on the reel. The coating provides a contacting surface in from the side edge 18 toward the central portion of about 0.5 mm on the top and bottom surfaces of the tape, occupying a small percentage of the area of a normal optical recording tape of 70 mm width. Since there is no plastic coating on the remaining centrally placed active recording area, the recording sensitivity is not lowered. The tension maintained on the tape in the reel prevents sagging of the mid-section of the tape. The coating should be of approximately the same thickness at each edge region to ensure even tension of the tape when wound on a reel and prevent skewing.

Figure 2:
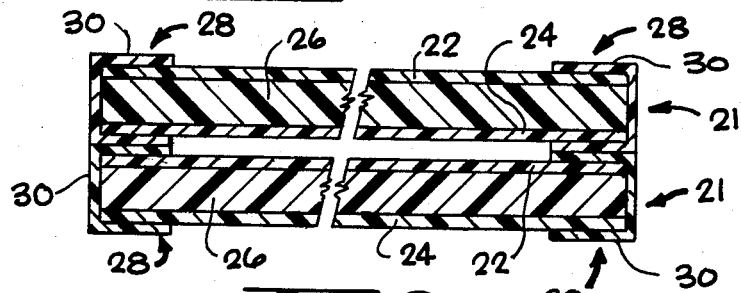
FIG. 2 is a side sectional view of two layers of a reeled optical recording tape of the present invention having recording layers on opposite sides.

FIG. 2 shows contacting adjacent tape sections of a double-sided optical recording tape 21 having two recording surfaces 22 and 24 on a substrate 26. The tape edge regions 28 are encased in a plastic coating 30. The approximately 10-micron spacing between adjacent recording surfaces provided by the edge coating prevents direct contact of the recording surfaces while stored on the reel.

Figure 3:
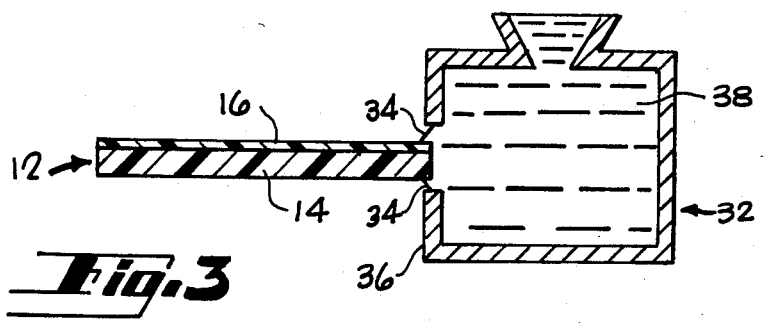
FIG. 3 is a side sectional view of the process for making the edge protective optical recording tape of FIGS. 1 and 2.

Liquid plastic may be applied to the tape lateral edge regions by a dispensing hopper 32 as shown in FIG. 3. A narrow slot 34 having access to the liquid is placed in a side wall 36 providing a means of applying a thin coating of liquid plastic 38 from the hopper to top, bottom, and end surfaces of the edge region of the tape. The edge region on each lateral region may be coated separately or, by providing a second dispensing hopper, both lateral regions may be coated simultaneously in an assembly line arrangement. The slot may be placed horizontally or vertically in the tank allowing passage of the tape in either direction.

Provision is made at the dispensing slot to ensure the application of an even thickness of the coating on the surfaces of the tape edge regions so as to provide for even winding on a reel. In addition, the slot is provided with means to prevent the coating from being applied more than 0.5 mm in from the tape lateral edges. The dimensions of the slot opening may be set so as to provide a certain thickness and width.

The curing of the coating may be accelerated by passing the coated tape through an air convection oven, or radiation-curing by means of infrared, ultraviolet or electron beam, after which it is wound on reels for storage.

Although the preferred embodiment shows a plastic coating encasing the top and bottom tape edge regions, the coating may be applied solely to the top surface edge region provided the plastic adheres to the recording surface material without placing excess stress on the optical recording surface during handling.

The plastic should be a thermosetting type such as epoxy resins, melamine formaldehyde, acrylics, polyurethanes, or thermosetting polyesters. These thermosetting plastics adhere to gelatin and are used if the optical recording surface is a reflective optical tape of the type made from a photosensitive silver-halide emulsion as described in U.S. Pat. Nos. 4,314,260 (Drexler), 4,284,716 (Drexler & Bouldin) and 4,269,917 (Drexler & Bouldin).

These optical recording media have electrically nonconductive surface layers of reflective silver particles dispersed in a gelatin matrix and are laser recordable DRAW media. The medium of U.S. Pat. No. 4,314,260 is produced by thermal conversion of a processed photographic silver-halide emulsion. The medium of U.S. Pat. No. 4,269,917 is produced by a silver diffusion transfer process which builds up the reflective recording surface on an activated silver-halide emulsion. The medium of U.S. Pat. No. 4,284,716 has an absorptive underlayer under the reflective surface layer and is produced by succeeding steps of chemical development and physical diffusion transfer development on an activated silver-halide emulsion. The plastic used to coat the edge regions of optical recording tapes of these types must adhere to the gelatin present in the processed material. However, the material used in other types of optical recording media may require different adhesive properties and the plastic coating material should be selected to meet those requirements.

Figure 4:
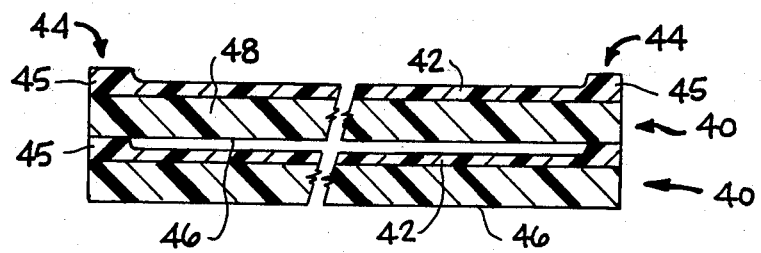
FIGS. 4 and 5 are side sectional views of two layers of different alternate embodiments of the optical recording tape of the present invention.

An alternate embodiment is shown in FIG. 4. Prior to processing a reflective optical recording tape from a photosensitive silver-halide emulsion according to the processes disclosed in U.S. Pat. Nos. 4,314,260, 2,284,716 and 4,269,917, the emulsion on a substrate is run through calendaring rollers so as to squeeze some of the emulsion in the central area of the tape to the edge regions. This creates thicker emulsion on the edge regions. After subsequent processing to achieve a reflective recording surface, the optical recording tape 40 resembles that shown in FIG. 4. An active reflective recording area 42 appears in the valley area. The optical recording surface increases in thickness at the tape edge regions 44, forming protuberances 45 which extend about 10 microns above the active recording area height. When in contact with an adjacent tape as shown in FIG. 4, these protuberances 45 prevent contact of the active recording area 42 with the bottom surface 46 of a substrate 48 of the adjacent tape section. Since no recording is done in the edge regions 44 of the recording surface, any particles embedded there from contact with the adjacent substrate surface will not affect the recording on the tape.

Figure 5:
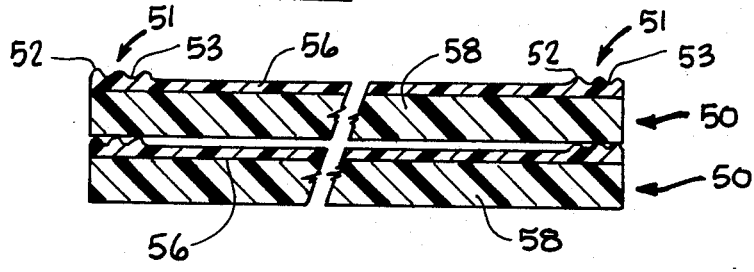

FIG. 5 shows another alternate embodiment. Either prior to or after formation of the optical recording surface, the edge regions 51 of the tape 50 are deformed by embossing the surface in such a way as to raise protuberances 52 and cavities 53 in the edge regions 51. The effect of the deformation is to force some of the recording material in spots to shift, forming indentations with raised surrounding areas. This is similar to the calendaring method in which the emulsion was squeezed out of the tape mid-section forming higher thickness at the sides. In this embodiment the deformation occurs solely in the edge regions. Slight protuberances of the size of 10 microns would be sufficient to prevent contact of the active recording surface 56 with the bottom surface of the substrate 58 of an adjacent tape.

The protective edges of the present invention may also be applied to other optical recording media such as circular and rectangular disks and strips to prevent contact of recording surfaces during storage. Due to the greater area of this type of recording media, the substrate is preferably of a stiff material to prevent mid-section sagging and contact. However, with substrates such as glass or plastic of sufficient rigidity, the protective edge surfaces of the present invention are effective in preventing contact of the active recording surfaces of adjacent stacked disks or strips.

We claim:

1. An optical recording medium comprising, a substrate having at least one major surface having a layer of optical recording material thereon, said substrate and said layer of optical recording material having lateral edge regions, said edge regions adhered to and encased in a thermosetting plastic coating, said coating having a thickness of less than 5 microns.

2. The medium of claim 1 wherein the plastic coating is less than 0.5 mm wide measured from the outward extremity of the edge regions toward the central portions of the surfaces.

3. An optical recording medium comprising, a tape having at least one major surface having a layer of optical recording material thereon and said tape and said layer having opposite lateral edge regions, said edge regions adhered to and encased in a thin thermosetting plastic coating, said plastic coating having a thickness of less than 5 microns and being less than 0.5 mm. wide from the outward extremity of the edge toward the central portions of the tape, thereby forming protuberances on said edge regions protecting the optical recording material from contact with other tape sections.

* * * * *

UNITED STATES PATENT AND TRADEMARK OFFICE
CERTIFICATE OF CORRECTION

PATENT NO. : 4,543,307

DATED : September 24, 1985

INVENTOR(S) : Jerome Drexler, et al.

It is certified that error appears in the above—identified patent and that said Letters Patent is hereby corrected as shown below:

Col. 1, lines 51-52, "on the redge regions" should read
- -on the edge regions- -.

Col. 3, line 36, "U.S. Pat. Nos. . . . 2,284,716" should read
- -U.S. Pat. Nos. . . . 4,284,716- -.

Signed and Sealed this

Fifteenth Day of July 1986

[SEAL]

Attest:

DONALD J. QUIGG

Attesting Officer

Commissioner of Patents and Trademarks